United States Patent
Fuhrmann

(10) Patent No.: US 6,856,726 B2
(45) Date of Patent: Feb. 15, 2005

(54) LIGHT WAVEGUIDE WITH INTEGRATED INPUT APERTURE FOR AN OPTICAL SPECTROMETER

(75) Inventor: Thomas Fuhrmann, Eningen (DE)

(73) Assignee: Wavetek Wandel Goltermann Eningen GmbH, Eningen (DE)

( * ) Notice: Subject to any disclaimer, the term of this patent is extended or adjusted under 35 U.S.C. 154(b) by 111 days.

(21) Appl. No.: 09/780,265

(22) Filed: Feb. 9, 2001

(65) Prior Publication Data

US 2001/0033711 A1 Oct. 25, 2001

(30) Foreign Application Priority Data

Feb. 12, 2000 (EP) .................................. 00102911

(51) Int. Cl.[7] .................................................. G02B 6/26
(52) U.S. Cl. ............................ 385/31; 385/37; 385/13; 385/77
(58) Field of Search .......................... 385/31, 77, 37, 385/10, 13, 39, 55, 76, 73

(56) References Cited

U.S. PATENT DOCUMENTS

| 4,474,429 | A | * | 10/1984 | Yoldas et al. ................. 385/43 |
| 5,200,024 | A | * | 4/1993 | Blonder et al. ................ 216/24 |
| 5,748,825 | A | * | 5/1998 | Rockwell, III ............. 385/126 |
| 5,800,249 | A | | 9/1998 | Levy et al. .................. 451/141 |
| 5,966,482 | A | * | 10/1999 | Noell et al. .................... 385/12 |
| 6,081,369 | A | * | 6/2000 | Waarts et al. .......... 359/341.33 |
| 6,137,938 | A | * | 10/2000 | Korn et al. .................. 385/123 |
| 6,304,688 | B1 | * | 10/2001 | Korn et al. .................. 385/123 |
| 6,366,726 | B1 | * | 4/2002 | Wach et al. ................. 385/115 |
| 6,421,179 | B1 | * | 7/2002 | Gutin et al. ................. 359/572 |
| 6,441,934 | B1 | * | 8/2002 | Boord et al. ................ 359/129 |

FOREIGN PATENT DOCUMENTS

WO    WO 98/55891    12/1998

* cited by examiner

Primary Examiner—K. Cyrus Kianni
(74) Attorney, Agent, or Firm—Reed Smith LLP

(57) ABSTRACT

In a light waveguide, the one end of which comprises a flat entering area for the light to be coupled into the core of the light waveguide, the entering area is narrower than the core diameter of the light waveguide and, around the entering area, the end of the light waveguide is laterally sloped up to the entering surface. Only the light which impinges on this entering area passes into the core and is guided therein.

11 Claims, 2 Drawing Sheets

US 6,856,726 B2

LIGHT WAVEGUIDE WITH INTEGRATED INPUT APERTURE FOR AN OPTICAL SPECTROMETER

RELATED APPLICATIONS

This application claims priority from European Patent Application No. 00 102 911.6 which was filed on Feb. 12, 2000, the complete disclosure of which is hereby incorporated by reference.

BACKGROUND OF INVENTIONS

1. Field of the Invention

The invention concerns a light waveguide, the one end of which comprises a flat entering surface for the light to be coupled into the core of the light waveguide, as well as an optical spectrometer with such a light waveguide.

2. Description of Related Art

An exit slit is necessary in an optical spectrum analyzer at the exit of its optics in the path of light in order to obtain a wavelength selection. The width of the exit slit determines, together with the other parameters of the optics, the wavelength resolution of the spectrum analyzer. For a high wavelength resolution with a size of the spectrum analyzer as small as possible, it is advantageous if the optics of the spectrum analyzer are limited by diffraction, i.e. the resolution is not limited by errors of the optics but by the wave nature of light. In optical communications it is common practice to couple light with a wavelength of about 1.25 $\mu$m to about 1.65 $\mu$m into a single mode glass fiber light waveguide. In this case, the optimal wavelength resolution is reached for a slit width of about 10 $\mu$m. For even smaller slit widths the wavelength resolution does not improve anymore, only the attenuation increases.

In order to produce an input slit for a light waveguide it is known in the art to use a freely supported slit in form of a thin metal foil. A slit with the desired width is created in the metal foil by suitable treatment, for example by means of a high power laser. However, this slit causes undesired polarization dependent loss (PDL). This PDL is the higher the thicker the foil is and the narrower the slit is. In particular, the PDL becomes extremely high if the slit width comes close to the range of the diffraction limitation.

Such a metal aperture can also be adjusted and glued onto the end of the light waveguide. However, adjustment and gluing involves a relatively large expenditure and additionally the reflecting metal aperture causes undesired back reflections.

Finally, the single mode glass fiber itself can be used as input slit, where the core diameter of the single mode glass fiber is about 9 $\mu$m (for a mode field diameter of about 10.5 $\mu$m and a wavelength of 1.55 $\mu$m). However, the exiting slit is then circular, such that already for small changes of the entering light ray relative to the exiting slit perpendicular to the direction of dispersion of the light a large increase of attenuation occurs. With changes in the ambience conditions (for example temperature, ageing) or mechanical strain (for example shock, vibration) there is a high danger that a power indicator shows a wrong value.

In contrast, it is the object of the invention to design a light waveguide of the aforementioned type with an input slit which has a low backreflection and can be produced with relatively low expenditure.

SUMMARY OF THE INVENTION

This object is solved according to the invention in that the entering area is narrower than the core diameter of the light waveguide and in that around the entering area the end of the light waveguide is laterally sloped up to the entering area.

In this connection the end of the light waveguide is preferably only sloped on both longitudinal sides of the entering area, which is designed rectangularly, and symmetrical with respect to an axial plane of the light waveguide.

Typically, glass fiber light waveguides are polished at the end straight or under an angle. If the end or face side of the light waveguide is polished at a slope on two sides facing one another diametrically (for example under 45° each), a rectangular entering surface remains in the center of the light waveguide in form of a ridge for suitable dimensions and angles, through which ridge light can be coupled into the core of the light waveguide. Only the light which impinges on this entering surface should get into the core and should be conducted there.

For light with a wavelength of about 1.25 $\mu$m to about 1.65 $\mu$m, preferably of about 1.55 $\mu$m, the entering surface and thus the effective input slit is preferably about 10 $\mu$m wide for light waveguides having a core diameter of about 50 $\mu$m. If the entering area is at least as long as the core diameter of the light waveguide, an entering area of about 10 $\mu$m×50 $\mu$m results, the narrower side of which determines the wavelength resolution. The longer side is the direction of tolerance in which the light spot to be coupled in can migrate without a change in the power coupled in. Although a core diameter of about 50 $\mu$m is preferred, in principle light waveguides with a larger core diameter can also be used.

Glass fiber light guides with typical cladding diameters of about 125 $\mu$m are, however, difficult to polish, since they break very easily. It is therefore advantageous, if the end of the fiber is taken up in a mount and is polished together with the mount. For example, a plug for the fiber end can serve as a mount, or several glass fiber light guides can be put into corresponding grooves of two sandwich plates which are then basilled together with the fiber ends taken up therein.

The end of the light waveguide is sloped such that light entering into the sloped surfaces is, preferably, not further guided in the core of the light waveguide. There, the angle of the sloped surfaces is chosen such that the light entering through the sloped surfaces is not further guided in the core. Here, steeper angles are advantageous, since the undesired light is then steeply reflected in the fiber and quickly leaves the fiber again or is annihilated and thus couples as little as possible into the core. The light entering into the sloped surfaces is refracted away from the core and is guided in the cladding of the light waveguide up to absorption.

In a further embodiment, which can also be provided on its own according to the invention, the entering area is narrower than the core diameter of the light waveguide wherein around the entering area a vapor deposited opaque metal layer is provided.

The vapor deposited opaque metal layer serves as aperture, such that light can only couple into the light waveguide via the entering area. Since the thickness of the vapor deposited metal layer is thin compared to a metal foil, almost no PDL occurs.

The invention also concerns an optical spectrometer, in particular an optical spectrum analyzer, with a detector for the light penetrating through the exit slit, wherein according to the invention the exit slit is formed by the end on the light entering side of a light waveguide designed as described above, wherein the detector is disposed at the other end of said light waveguide.

The detector including the corresponding electronics is spatially separated or decoupled from the optics of the spectrometer by the light waveguide. The exit slit of the optics is formed by the preferably rectangular entering area of the sloped light waveguide. If the narrower side of the slit is in the range of the core diameter of a single mode fiber (about 10 $\mu$m for wavelengths of about 1.55 $\mu$m), a high wavelength resolution can be obtained. Within a for example 50 $\mu$m long slit the light spot to be coupled in can then migrate perpendicular to the direction of dispersion of the light in longitudinal direction adequately far, until a change in power occurs at the detector.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

DESCRIPTION OF THE PREFERRED EMBODIMENTS

Figure 1:
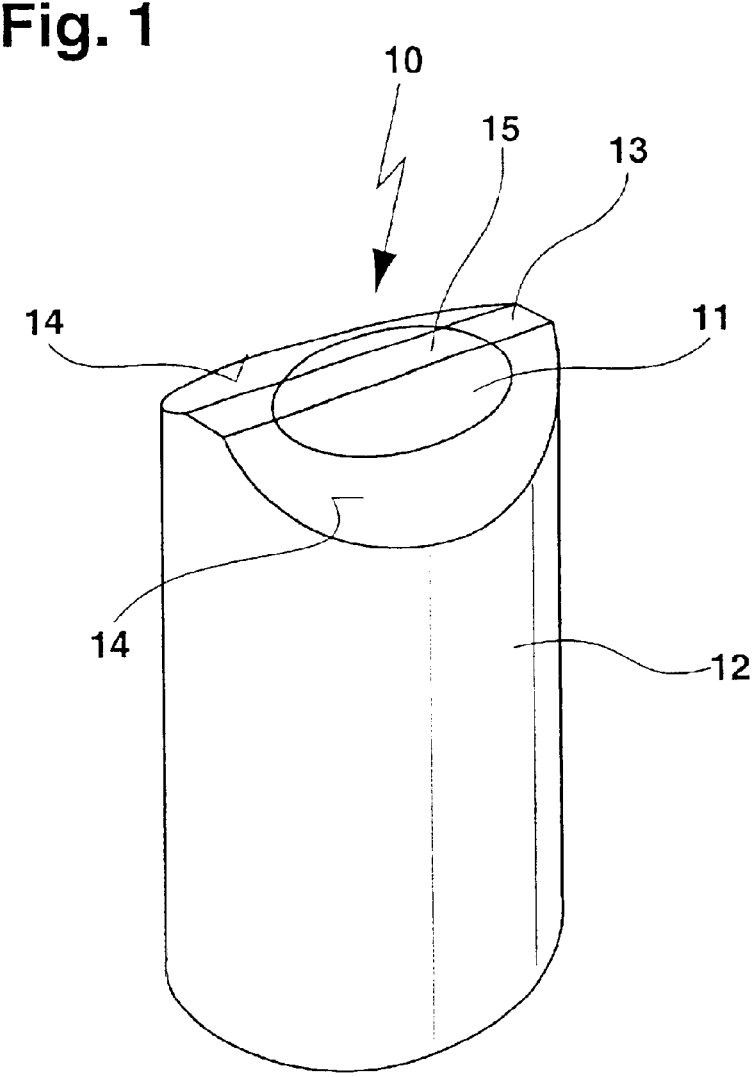
FIG. 1 shows a first embodiment of an inventive light waveguide in a perspective view.
Figure 2:
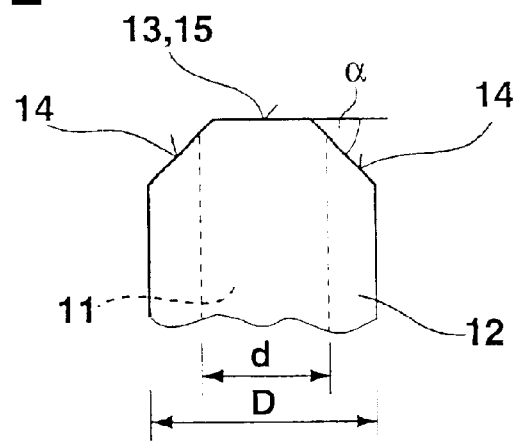
FIG. 2 shows a side view of the light waveguide shown in FIG. 1.

The light waveguide 10 shown in FIG. 1 and FIG. 2 is a glass fiber with a core 11 (core diameter d) and a cladding 12 (cladding diameter D). The shown end on the light entering side of the light waveguide 10 is designed rooflike with a flat ridge surface 13 forming the "ridge of the roof" and two lateral sloped surfaces 14.

This roof shape can be produced by slanting the end of the light waveguide on two sides facing one another diametrically, for example by polishing, such that the ridge surface 13 in the shape of an approximately rectangular ridge of the roof remains on the face in the center of the light waveguide 10. The ridge surface 13 which is placed within the core diameter d forms an entering area 15, which is approximately rectangular, through which light can couple into the core 11. The narrow side of the rectangular entering area 15 is smaller than the core diameter d, whereas its longitudinal side corresponds approximately to the core diameter d. The narrow side is the direction of dispersion, which determines the wavelength resolution. The longitudinal side is the direction of tolerance in which a light spot to be coupled in can migrate, without a change in the power coupled in.

The angles of the sloped surfaces 14 (in the embodiment shown approximately 45°) are chosen such that, if possible, all the light, which enters into the light waveguide 10 via the sloped surfaces 14, is not further guided in the core 11. The light entering into the sloped surfaces 14 is refracted away from the core 11 and is conducted in the cladding 12 of the light waveguide 10 up to absorption. The entering area therefore forms a slit diaphragm on the light waveguide 10.

For light with a wavelength of about 1,25 $\mu$m to about 1,65 $\mu$m, in particular of about 1,55 m, the entering area 15 is preferably about 10 $\mu$m narrow, such that the entering surface is about 10 $\mu$m×50 $\mu$m for a typical core diameter d of about 50 $\mu$m.

The sloped surfaces 14 are preferably at an angle $\alpha$ (FIG. 2) to the entering surface 15, which angle fits the following equation:

$$\frac{n_{C1}}{n_{C0}} > \sqrt{1 - \left(\frac{\sin(\alpha + \alpha_2)}{n_{C0}}\right)^2} * \cos(\alpha) + \frac{\sin(\alpha + \alpha_2)}{n_{C0}} * \sin(\alpha),$$

wherein $n_{C0}$ is the refraction index of the core 11, $n_{C1}$ is the refraction index of the cladding 12 and $\alpha_2$ is the entering angle of the light ray to the normal line of the entering surface 15.

Figure 3:
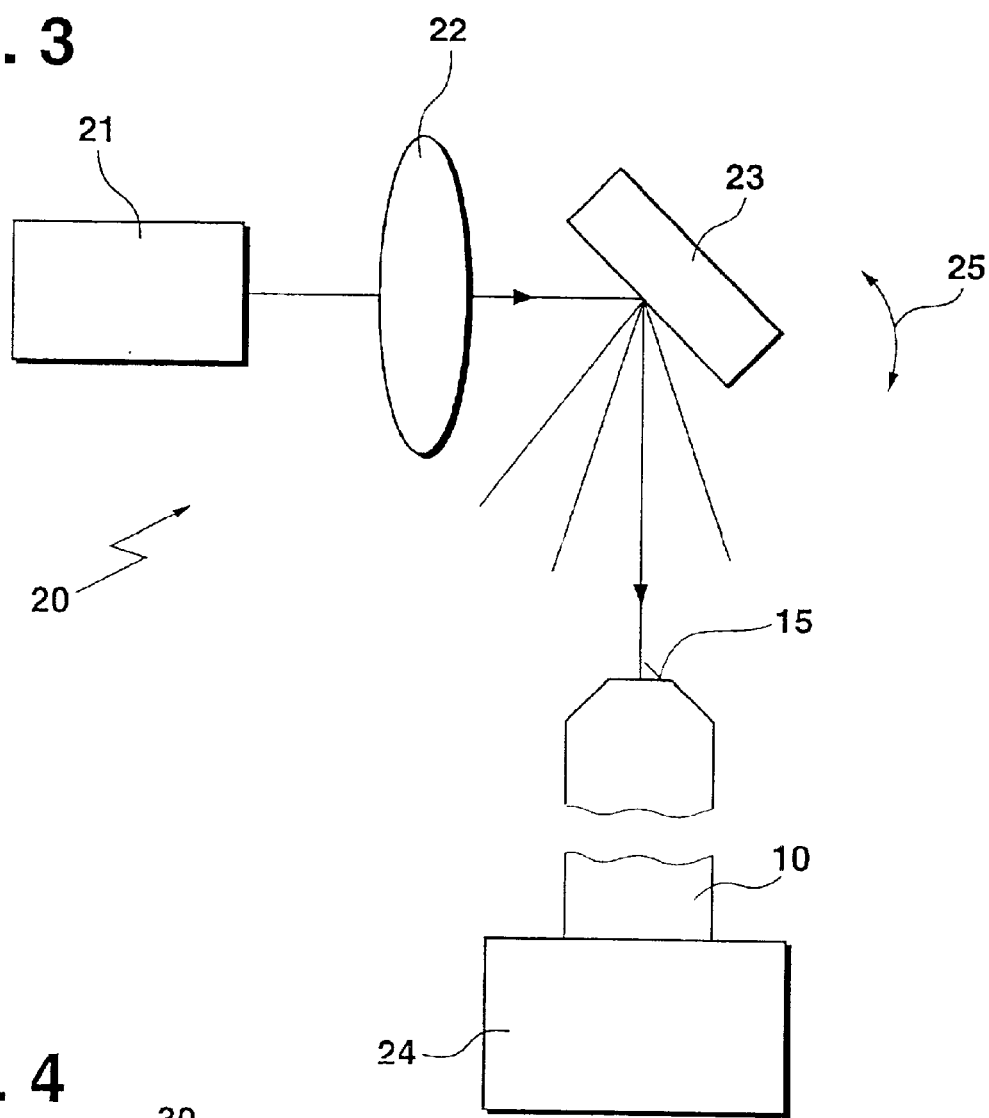
FIG. 3 shows the typical construction of an optical spectrum analyzer and with the light waveguide shown in FIG. 1.

In FIG. 3 the typical construction of an optical spectrum analyzer 20 is shown. The light entering via an input slit 21 is collimated via a lens 22 onto an optical reflection grating 23, which diffracts the wavelengths present in light to different extents. Only the light impinging the entering surface or area 15 of the light waveguide 10 is conducted to a detector 24 (for example a photo diode), such that the light intensity can be measured for a given wavelength. By turning the reflection grating 23 in direction of the double arrow 25, the wavelength measured each time can be changed. The detector 24 is spatially separated or decoupled from the optics of the spectrum analyzer 20 by the light waveguide 10. The exit slit of the optics is formed by the preferably rectangular entering surface 15 of the beveled light waveguide 10. If the narrow side of the entering surface 15 is in the range of the light ray limited by diffraction (about 10 $\mu$m for a wavelength of about 1.55 $\mu$m), the optimal wavelength resolution can be obtained. Within a, for example 50 $\mu$m long, entering surface 15 the light spot to be coupled in can migrate in longitudinal direction perpendicular to the direction of dispersion of the light accordingly far, until a change in power occurs at the detector 24.

Figure 4:
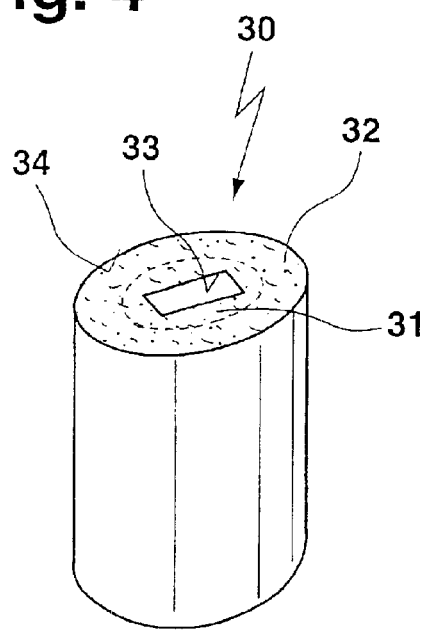
FIG. 4 shows a second embodiment of an inventive light waveguide in a perspective view.

FIG. 4 shows a light waveguide 30 with a core 31 and a cladding 32. The face on the light entering side of the light waveguide 30 is provided with a vapor deposited opaque metal layer 34, with the exception of an entering window or area 33 lying within the core 31. This opaque metal layer 34 serves as an aperture, such that light can only couple into the light waveguide 30 via the light entering area 33.

The present invention is not to be limited in scope by the preferred embodiments described in the specification. Additional advantages and modifications, which will readily occur to those skilled in the art from consideration of specification and practice of the invention are intended to be within the spirit and scope of the following claims.

I claim:

1. An optical spectrometer comprising:
   an optical reflection grating for diffracting the wavelengths of an incoming light,
   an exit slit for spatial wavelength selection of the diffracted wavelengths, and
   a detector for the light penetrating through the exit slit,
   wherein the exit slit is formed by an entering area of a first end of the light waveguide, and the detector is disposed at a second end of the light waveguide;
   wherein the entering area is narrower than the core diameter of said light waveguide, and around the entering area a vapor deposited opaque metal layer is provided.

2. The optical spectrometer according to claim 1, wherein the first end of the light waveguide is only sloped on both lateral sides of the entering area designed rectangularly.

3. The optical spectrometer according to claim 1, wherein the first end of the light waveguide is sloped such that light entering into the sloped surfaces is not further guided in the core of the light waveguide.

4. The optical spectrometer according to claim 1, wherein the first end of the light waveguide is symmetric with respect to an axial plane of the light waveguide.

5. The optical spectrometer according to claim 1, wherein the entering area is at least as long as the core diameter of the light waveguide.

6. The optical spectrometer according to claim 1, wherein the first end of the light waveguide is only sloped on both lateral sides of the entering area designed rectangularly, the first end of the light waveguide is sloped such that light entering into the sloped surfaces is not further guided in the core of the light waveguide, the first end of the light waveguide is symmetric with respect to an axial plane of the light waveguide, and the entering area is at least as long as the core diameter of the light waveguide.

7. An optical spectrometer comprising:
   an optical reflection grating for diffracting the wavelengths of an incoming light,
   an exit slit for spatial wavelength selection of the diffracted wavelengths, and
   a detector for the light penetrating through the exit slit,
   wherein the exit slit is formed by an entering area of a first end of the light waveguide, and the detector is disposed at a second end of said light waveguide;
   wherein the first end of the light waveguide is only sloped on both lateral sides of the entering area designed rectangularly;
   wherein the first end of the light waveguide is sloped such that light entering into the sloped surfaces is not further guided in the core of the light waveguide.

8. The optical spectrometer according to claim 7, wherein the first end of the light waveguide is symmetric with respect to an axial plane of the light waveguide.

9. The optical spectrometer according to claim 7, wherein the entering area is narrower than the core diameter of the light waveguide, and around the entering area a vapor deposited opaque metal layer is provided.

10. The optical spectrometer according to claim 7, wherein the entering area is at least as long as the core diameter of the light waveguide.

11. The optical spectrometer according to claim 7, wherein the first end of the light waveguide is symmetric with respect to an axial plane of the light waveguide, and the entering area is at least as long as the core diameter of the light waveguide.

* * * * *